R. S. HOYT.
ARTIFICIAL LINE.
APPLICATION FILED AUG. 7, 1915.

1,167,694.

Patented Jan. 11, 1916.

Inventor:
R. S. Hoyt
per Thomas D. Lockwood
Attorney

UNITED STATES PATENT OFFICE.

RAY S. HOYT, OF BROOKLYN, NEW YORK, ASSIGNOR TO AMERICAN TELEPHONE AND TELEGRAPH COMPANY, A CORPORATION OF NEW YORK.

ARTIFICIAL LINE.

1,167,694.  Specification of Letters Patent.  Patented Jan. 11, 1916.

Application filed August 7, 1915. Serial No. 44,174.

*To all whom it may concern:*

Be it known that I, RAY S. HOYT, residing at Brooklyn, in the county of Kings and State of New York, have invented certain Improvements in Artificial Lines, of which the following is a specification.

My invention relates to an artificial line, and more particularly to an artificial line which closely simulates the impedance of a long uniform, that is a non-loaded or a continuously loaded, transmission line, over the range of telephonic frequencies.

It has been known hitherto that the impedance of a transmission line can be simulated to any desired degree of precision by constructing an artificial line consisting of a series of sections, each section containing an inductance element and a resistance element in series with the line and a condenser in shunt across the line. Such an artificial line is a model of the actual line, differing from the actual line only in that the electrical constants of the actual line are uniformly distributed while those of the artificial line are concentrated or lumped.

The object of the present invention is to provide, as a suitable substitute for such model of the actual line, a simple circuit arrangement, preferably a two-element structure, which shall simulate closely the impedance of the actual line.

Figure 1:
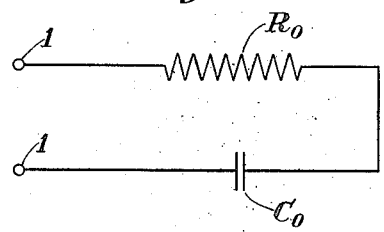
Figure 2:
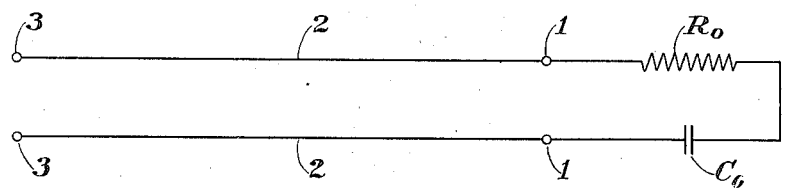

In the accompanying drawings, Figure 1 is a diagram showing the artificial line of my invention; and Fig. 2 is a diagram showing the artificial line of my invention connected to a transmission line.

As shown in Fig. 1, the artificial line of my present invention consists of a resistance element $R_o$ and a condenser $C_o$ connected in series with each other and having values determined in the manner hereinafter set forth. Fig. 2 shows said artificial line connected through its terminals 1, 1 to a uniform transmission line 2, 2. With the arrangement shown in Fig. 2, a short length of transmission line will behave like an infinitely long line with respect to a voltage impressed across the terminals 3, 3.

A well-known general formula for the impedance of a long uniform line is:

$$K = \sqrt{\frac{R + ipL}{G + ipC}} \quad (1)$$

In the above formula, K denotes the impedance; R, L, G and C denote the distributed resistance, inductance, leakage conductance, and capacity, respectively, per unit length of line;

$$i = \sqrt{-1}; \text{ and } p = 2\pi f,$$

in which $f$ denotes the frequency in cycles per second.

In practice the leakage conductance, G, is so small that it may be disregarded so far as its effect on the impedance is concerned, and hence a close approximation of the foregoing formula is:

$$K = \sqrt{\frac{L}{C}} \sqrt{1 - i\frac{R}{pL}} \quad (2)$$

In the case of ordinary aerial lines, the resistance R is quite small compared with $pL$ over the range of telephonic frequencies, so that a further approximation is:

$$K = \sqrt{\frac{L}{C}} - i\frac{R}{2p}\left(\frac{1}{\sqrt{LC}}\right) \quad (3)$$

Now the value of K as expressed by equation (3) is precisely the impedance of a resistance $R_o$ in series with a capacity $C_o$ if $$R_o = \sqrt{\frac{L}{C}} \quad (4)$$

$$C_o = \frac{2\sqrt{LC}}{R} \quad (5)$$

It therefore follows that the impedance of $R_o$ in series with $C_o$, when $R_o$ and $C_o$ are determined by equations (4) and (5), is very closely equal to the impedance of the uniform transmission line. Equations (4) and (5) are then the design formulæ for determining the values of the two elements $R_o$ and $C_o$ of this invention.

As an example of the application of my invention, let it be required to construct an artificial line to simulate the impedance of a long uniform transmission, having the following specifications:—An aerial line, consisting of two parallel #8 B. W. G copper wires, having an inductance per mile=0.00337 henries, a capacity per mile= 0.0092×10⁻⁶ farads, and a resistance per mile=4.14 ohms. In such case L=0.00337 henries; C=0.0092×10⁻⁶ farads; and R= 4.14 ohms. By substitution in formulæ (4) and (5) of these values of the line constants, $R_o$=606 ohms and $C_o$=2.69×10⁻⁶ farads.

I claim:—

An artificial line simulating the impedance of an actual uniform transmission line and comprising resistance and capacity elements connected in series, the value of said resistance element being approximately equal to $$\sqrt{\frac{L}{C}}$$

and the value of said capacity element being approximately equal to $$\frac{2\sqrt{LC}}{R},$$

where L, C and R denote the distributed inductance, the distributed capacity and the distributed resistance, respectively, per unit length of line.

In testimony whereof, I have signed my name to this specification in the presence of two subscribing witnesses, this 4th day of August 1915.

RAY S. HOYT.

Witnesses:
GEORGE E. FOLK,
JOHN R. CARSON.